(12) United States Patent
Liu et al.

(10) Patent No.: US 11,468,169 B1
(45) Date of Patent: Oct. 11, 2022

(54) DARK STORAGE SUPPORT FOR AS-A-SERVICE MODEL

(71) Applicant: DELL PRODUCTS, LP, Round Rock, TX (US)

(72) Inventors: Wei G Liu, Austin, TX (US); Austin Bolen, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/243,030

(22) Filed: Apr. 28, 2021

(51) Int. Cl.
| | |
|---|---|
| G06F 21/57 | (2013.01) |
| G06F 21/10 | (2013.01) |
| G06F 13/24 | (2006.01) |
| G06F 13/40 | (2006.01) |
| G06F 21/79 | (2013.01) |
| G06F 21/80 | (2013.01) |

(52) U.S. Cl.
CPC .......... *G06F 21/572* (2013.01); *G06F 13/24* (2013.01); *G06F 13/4081* (2013.01); *G06F 21/105* (2013.01); *G06F 21/79* (2013.01); *G06F 21/80* (2013.01); *G06F 2213/0026* (2013.01)

(58) Field of Classification Search
CPC .... G06F 21/572; G06F 13/24; G06F 13/4081; G06F 21/105; G06F 21/79; G06F 21/80; G06F 2213/0026
See application file for complete search history.

(56) References Cited

U.S. PATENT DOCUMENTS

| | | | | |
|---|---|---|---|---|
| 8,566,960 | B2* | 10/2013 | Richardson | G06F 21/73 726/28 |
| 9,116,624 | B2 | 8/2015 | Canepa et al. | |
| 10,572,397 | B2* | 2/2020 | Bunker | G06F 13/4282 |
| 10,637,793 | B1* | 4/2020 | Scott | H04L 41/0894 |
| 10,809,919 | B2 | 10/2020 | Hayes et al. | |
| 2002/0188704 | A1* | 12/2002 | Gold | G06F 21/10 709/221 |
| 2008/0271122 | A1* | 10/2008 | Nolan | H04L 63/102 726/4 |
| 2014/0090051 | A1* | 3/2014 | Brundridge | G06F 21/105 726/17 |
| 2015/0033355 | A1* | 1/2015 | Ando | G06F 21/12 726/26 |
| 2015/0370575 | A1* | 12/2015 | Tonry | G06F 9/4406 713/2 |
| 2016/0203302 | A1* | 7/2016 | Huscroft | G06F 21/105 726/29 |

(Continued)

*Primary Examiner* — Glenn A. Auve
(74) *Attorney, Agent, or Firm* — Larson Newman, LLP

(57) ABSTRACT

An information handling system includes a host processing system, first and second data storage devices having respective first and second data storage capacities, and a license manager. The license manager implements a first license, receives a second license, and implements the second license without rebooting the information handling system. The first license defines a first configuration where the first data storage device is visible and the first data storage capacity is available to the host processing system, and the second data storage device is not visible and the second data storage capacity is not available to the host processing system. The second license defines a second configuration where both data storage devices are and both data storage capacities are available to the host processing system.

20 Claims, 6 Drawing Sheets

(56) References Cited

U.S. PATENT DOCUMENTS

| | | | |
|---|---|---|---|
| 2017/0235928 A1* | 8/2017 | Desai | G06F 21/572 |
| | | | 713/2 |
| 2019/0095593 A1* | 3/2019 | Cisneros | H04L 9/30 |
| 2021/0200839 A1* | 7/2021 | Cech | G06F 21/6281 |
| 2022/0067127 A1* | 3/2022 | Covolato | G06F 21/602 |

* cited by examiner ns, enterprise data storage, or global communications. In addition, information handling systems may include a variety of hardware and software resources that may be configured to process, store, and communicate information and may include one or more computer systems, data storage systems, and networking systems.

DARK STORAGE SUPPORT FOR AS-A-SERVICE MODEL

FIELD OF THE DISCLOSURE

This disclosure generally relates information handling systems, and more particularly relates to providing dark storage to support an as-a-service model in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a host processing system, first and second data storage devices having respective first and second data storage capacities, and a license manager. The license manager may implement a first license, receives a second license, and implements the second license without rebooting the information handling system. The first license may define a first configuration where the first data storage device is visible and the first data storage capacity is available to the host processing system, and the second data storage device are not visible and the second data storage capacity is not available to the host processing system. The second license may define a second configuration where both data storage devices are and both data storage capacities are available to the host processing system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
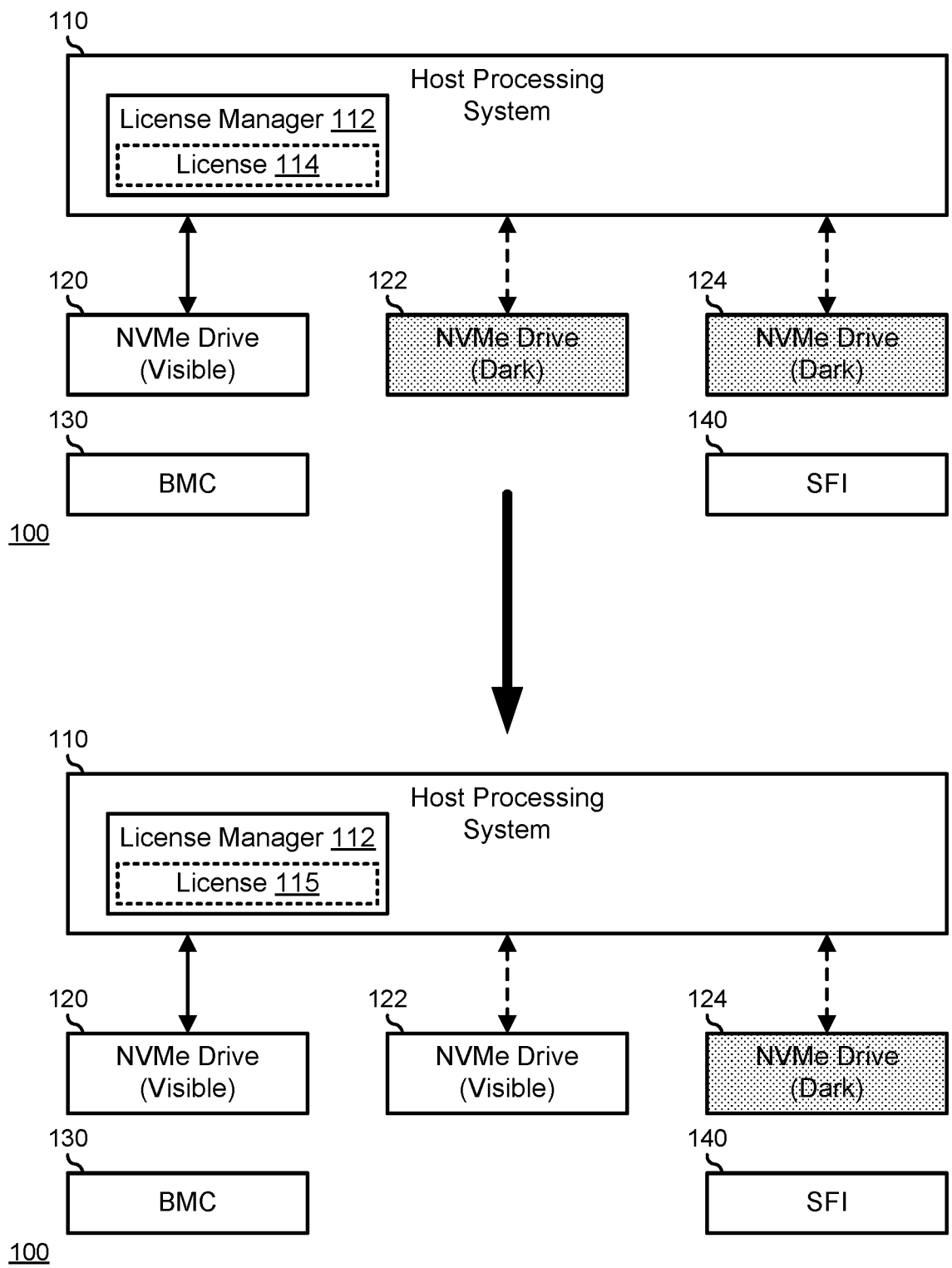
FIG. 1 is a block diagram illustrating an information handling system according to an embodiment of the current disclosure.

FIG. 1 illustrates an information handling system 100 including a host processing system 110, data storage devices 120, 122, and 124, a baseboard management controller (BMC) 130, and a system firmware intermediary (SFI) 140. Information handling system 100 represents a data storage and computing system, such as a storage server installed in a server rack of a data center. In particular, information handling system 100 represents a licensed product that provides agreed upon levels of compute capacity, input/output (I/O) and network capacity, data storage capacity, and the like. As such, information handling system 100 includes a license manager 112, illustrated here as being associated with host processing system 110. License manager 112 need not reside in host processing system 110, but may be associated with other elements of information handling system 100, such as with BMC 130.

License manager 112 operates to enforce the terms of a license 114 for functions, features, and operability of information handling system 100. As such, information handling system 100 is illustrated in the top portion of FIG. 1 with the storage capacity of data storage device 120 as being available to host processing system 110, and with data storage devices 122 and 124 being unavailable to the host processing system. As used herein, a data storage device that is installed into information handling system 100, and that makes its storage capacity available to host processing system 110, will be described as a "visible" data storage device. In particular, where data storage devices 120, 122, and 124 represent Non-Volatile Memory-Express (NVMe) data storage devices, an NVMe controller of the data storage device will be understood to be initialized and enumerated on a Peripheral Component Interconnect-Express (PCIe) root port of host processing system 100, and the data storage capacity of the data storage device will be a non-zero quantity of data storage capacity.

Further, a data storage device that is installed into information handling system 100, and that does not make its storage capacity available to host processing system 110, will be described as an "invisible" data storage device, and the data storage capacity of an invisible data storage device will be described as "dark" data storage capacity. Here, in the case where data storage devices 120, 122, and 124 represent NVMe data storage devices, the NVMe controller may remain uninitialized and unenumerated, or the data storage capacity, as defined by a namespace definition on the data storage device, will indicate a zero quantity of data storage capacity.

Here, in accordance with a variety of "as-a-service" business models, it may be advantageous for a user of information handling system 100 to purchase and use the information handling system with a fully populated data storage capacity, as illustrated by data storage devices 120, 122, and 124, but to only pay for the usage of a limited amount of the data storage capacity, leaving the remaining storage capacity unused until a later time when demand for the data storage capacity increases or decreases. As such, the top portion of FIG. 1 illustrates a time when the user of information handling system 100 has obtained an initial license 114 that defines an initial licensed configuration, under which license manager 112 makes the data storage capacity of only data storage device 120 visible.

The bottom portion of FIG. 1 further illustrates a later time when the user of information handling system 100 has obtained a new license 115 that defines a new licensed configuration under which license manager 112 makes the data storage capacity of data storage device 122 visible. It will be understood that, under the terms of license 115, license manager 112 makes data storage device 124 to remain invisible, and the storage capacity of data storage device 124 remains dark.

In a particular example, data storage devices 120, 122, and 124 may be understood to be high-capacity NVMe data storage devices with four (4) terabytes (TB) of data storage capacity each, making the total installed data storage capacity 12 TB. However, under license 114, the visible storage capacity is only four (4) TB, while the dark storage capacity is eight (8) TB. Then, under license 115, the visible storage capacity is increased to eight (8) TB, while the dark storage capacity is reduced to four (4) TB. As described herein, changes in the functions, features, and operability of information handling system 100 under new license 115 will be implemented without resorting to a system reboot process, but will be implemented in the course of normal operation of the information handling system.

In particular, a traditional method for providing dark data storage capacity would be to disable the PCIe root ports associated with the invisible data storage devices, such that the invisible data storage devices do not become initialized at system boot, and do not respond to PCIe bus discovery, and that as such, the only way to discover invisible data storage devices in the traditional method would be to reboot the information handling system to permit the selected invisible data storage devices to be discovered and initialized. As described in the current embodiments, the visible data storage capacity will be shown as increasing under new license 115, it will be understood that a new license may likewise decrease the visible data storage capacity as needed or desired. In general, decreases in the visible data storage capacity based upon a new license will be managed similarly to increases in the visible data storage capacity, except as described further below.

Figure 2:
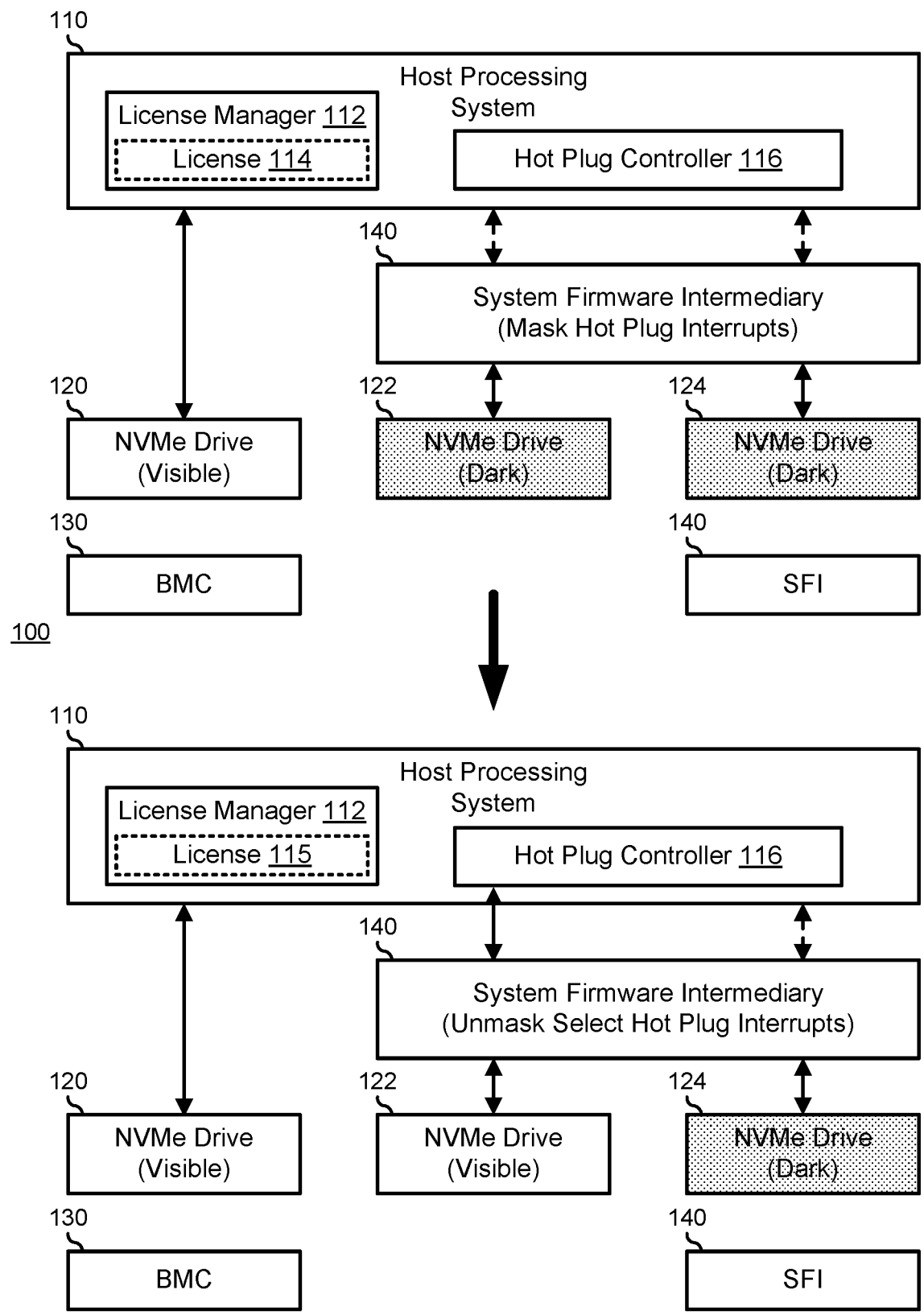
FIG. 2 is a block diagram illustrating an embodiment of a method of providing dark data storage on the information handling system of FIG. 1.
Figure 3:
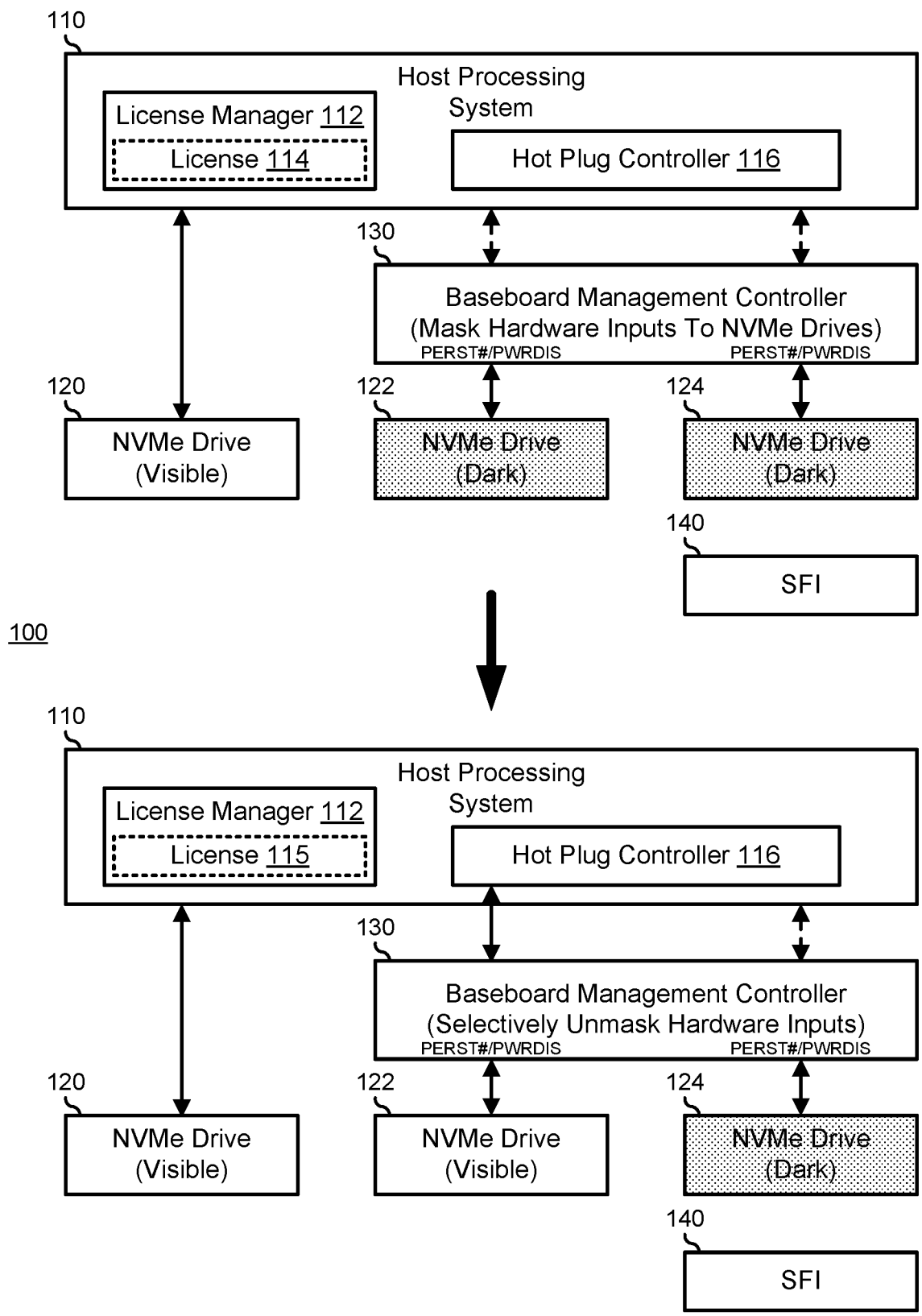
FIG. 3 is a block diagram illustrating another embodiment of a method of providing dark data storage on the information handling system of FIG. 1.
Figure 4:
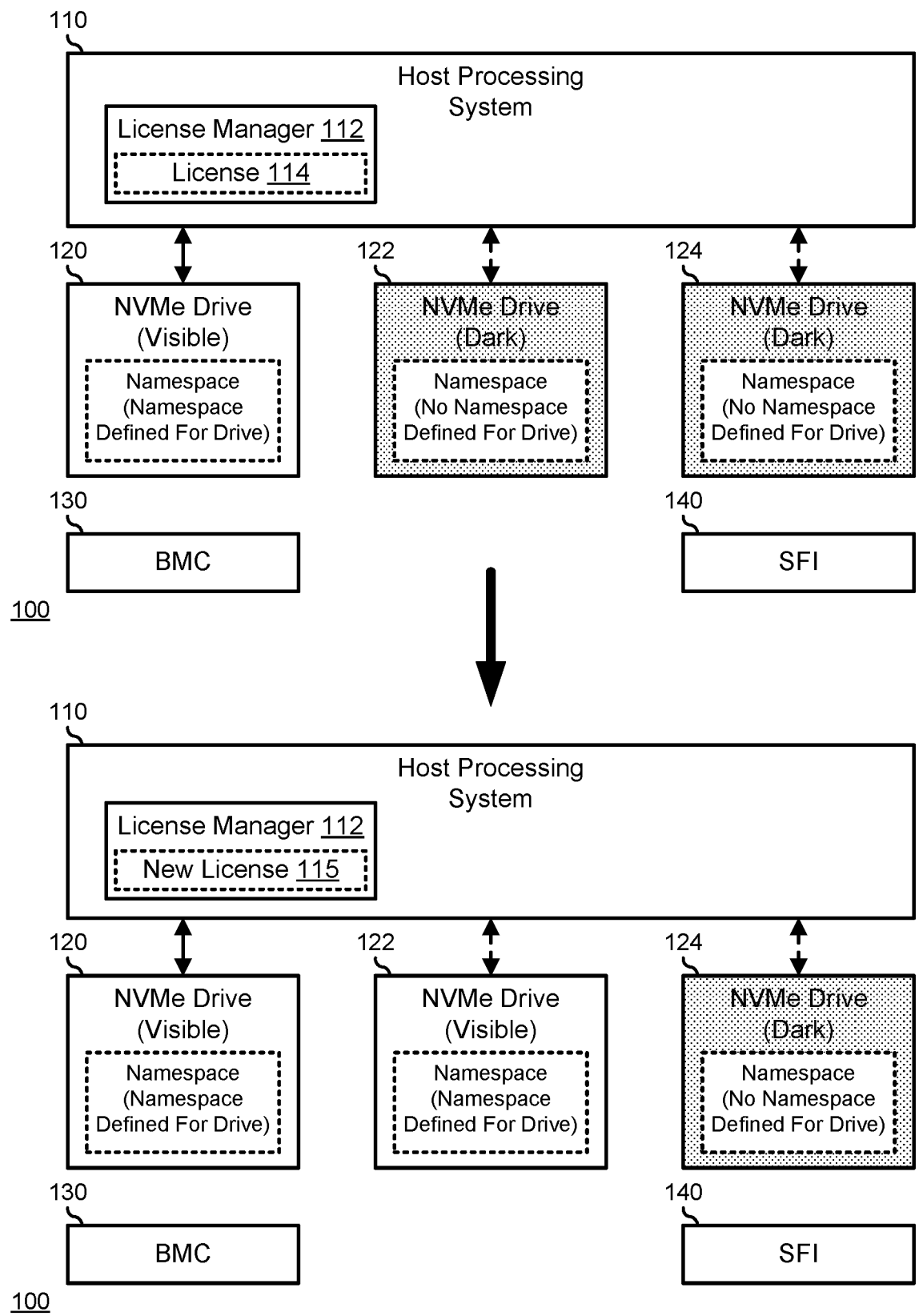
FIG. 4 is a block diagram illustrating another embodiment of a method of providing dark data storage on the information handling system of FIG. 1.

FIGS. 2-4 illustrate various embodiments for managing dark storage capacity on information handling system 100. FIG. 2 illustrates an embodiment that utilizes SFI 140 to mask data storage devices 122 and 124 from host processing system 110. SFI 140 represents an interface which may be defined in a particular standard, such as a Peripheral Component Interconnect-Express (PCIe) standard. In particular, SFI 140 isolates the PCIe root ports and downstream ports associated with data storage devices 122 and 124 from the elements of host processing system 110, such as from a basic input/output system or Universal Extensible Firmware Interface (BIOS/UEFI), any operating system (OS), drivers, applications, or other elements instantiated on the host processing system. As such, where data storage devices 122 and 124 represent NVMe data storage devices, their respective NVMe controllers will remain uninitialized. The top portion of FIG. 2 illustrates information handling system 100 as instantiated under license 114, with data storage devices 122 and 124 being masked from host processing system 110 by SFI 140.

Then, in the bottom portion of FIG. 2, license 115 is instantiated, and SFI 140 operates in conjunction with the BIOS/UEFI and BMC 130 to unmask data storage device 122. In particular, when license 115 is to be implemented, license 114 is updated with license 114 in license manager 112, and the license manager invokes the BIOS/UEFI via a System Control Interrupt (SCI). In response, the BIOS/UEFI issues a command to license manager 112, such as an IPMI command, to retrieve the new storage configuration associated with license 115. The BIOS/UEFI then configures SFI 140 to unmask data storage device 122.

There are two possible responses to unmask data storage device 122. Where hot-plug controller 116 is present, SFI 140 operates to provide a notification interrupt to hot plug controller 116 to indicate that data storage device 122 has been added to information handling system 100. Here, the actions taken by hot plug controller 116 to power on data storage device 122 and to de-assert any RESET signals to the data storage device may be understood to have already occurred during the boot up of information handling system 100, and thus are redundant in this regard. Finally, SFI 140 operates to provide an installation interrupt to host processing system 110 that data storage device 122 has been powered on and is ready for bus enumeration, as needed or desired. In another embodiment, BMC 130 implements license manager 112, and the BMC provides a System Control Interrupt (SCI) to notify host processing system 110 of an ACPI (Advanced Configuration and Power Interface) event to enable data storage device 122 within the ACPI tables of the host processing system, and a system BIOS/UEFI enables the associated port. On the other hand, where hot plug controller 116 is not available, the system BIOS/UEFI provides a DEVICE_CHECK or BUS_CHECK command to enumerate the bus associated with data storage device 122.

In another case where a new license provides for a decrease in the data storage capacity of information handling system 100, such as where data storge devices 120, 122, and 124 are all visible, SFI 140 operates to simulate a hot remove of one of the data storage devices. Here, it will be understood that license manager 112 will operate to warn the user of information handling system 100 to back-up, remove, or otherwise dispose of the data on the data storage device to be removed, and ensure adequate acquiescence to the decrease in the data storage capacity prior to the implementation of the decrease in data storage capacity.

FIG. 3 illustrates an embodiment that utilizes BMC 130 to drive hardware signals to hold invisible data storage devices 122 and 124 in a pre-initialized state. As such, where data storage devices 122 and 124 represent NVMe data storage devices, their respective NVMe controllers will remain uninitialized. The top portion of FIG. 3 illustrates information handling system 100 as instantiated under license 114, with data storage devices 122 and 122 being masked from host processing system 110 by BMC 130. In a particular embodiment, BMC 130 operates mask data storage devices 122 and 124 by retaining the PCIe reset (PERST #) signal in the asserted (actvive low) state, keeping the data storage devices disabled. In another embodiment, BMC 130 operates to mask data storage devices 122 and 123 by retaining the PCIe power disable (PWRDIS) signal in the asserted state to keep the power plane to the data storage devices disabled. Then, in any of the above embodiments, in the bottom portion of FIG. 3, license 115 is instantiated, and BMC 130 operates to unmask data storage device 122.

Here, the assertion (active low) of the PCIe reset (PERST #) signal, or the deasserting of the PCIe power disable (PWRDIS) signal will result in hot plug controller 116 executing a hot plug event, as described above, thereby making data storage device 122 visible to host processing system 110, or, where hot plug controller 116 is not available, will result in the system BIOS/UEFI providing a DEVICE_CHECK or BUS_CHECK command to enumerate the bus associated with data storage device 122. In the case where a new license provides for a decrease in the data storage capacity of information handling system 100, such as where data storge devices 120, 122, and 124 are all visible, BMC 130 operates to simulate a hot remove of one of the data storage devices by, alternately asserting the PCIe reset (PERST #), or asserting the PCIe power disable (PWRDIS) signal.

FIG. 4 illustrates an embodiment that utilizes NVMe namespaces to define the visible and dark data storage capacity. As such, the respective NVMe controllers of data storage devices 122 and 124 are initialized, but the namespace definitions will provide for a zero quantity of data storage capacity. The top portion of FIG. 4 illustrates information handling system 100 as instantiated under license 114, with data storage devices 122 and 124 being masked from host processing system 110 by BMC 130. Here, data storage device 120 includes a namespace that defines the data storage capacity of the data storage device, and hence the data storage device is visible.

On the other hand, data storage devices 122 and 124 have no namespaces defined, and so the data storage capacity of data storage devices 122 and 124 are dark. Then, in the bottom portion of FIG. 4, license 115 is instantiated, and a namespace is defined for data storage device 122, making the data storage capacity of data storage device 122 visible. Note that in this embodiment, the NVMe controllers for each of data storage devices 120, 122, and 124 are visible to host processing system 110, but the ability to utilize the associated storage capacity is dictated by the namespaces instantiated on the data storage devices. Here, when a license is instantiated that reduces the data storage capacity, the namespace is deleted in the associated data storage device. It will be understood that the NVMe standard defines a notification mechanism called an Asynchronous Event Request. Here, when a namespace is added or deleted, the NVMe drive sends this Asynchronous Event Request to the host OS to notify that new namespaces have been added or deleted and then the OS rescans and adds or removes the namespace from use in the OS.

Figure 5:
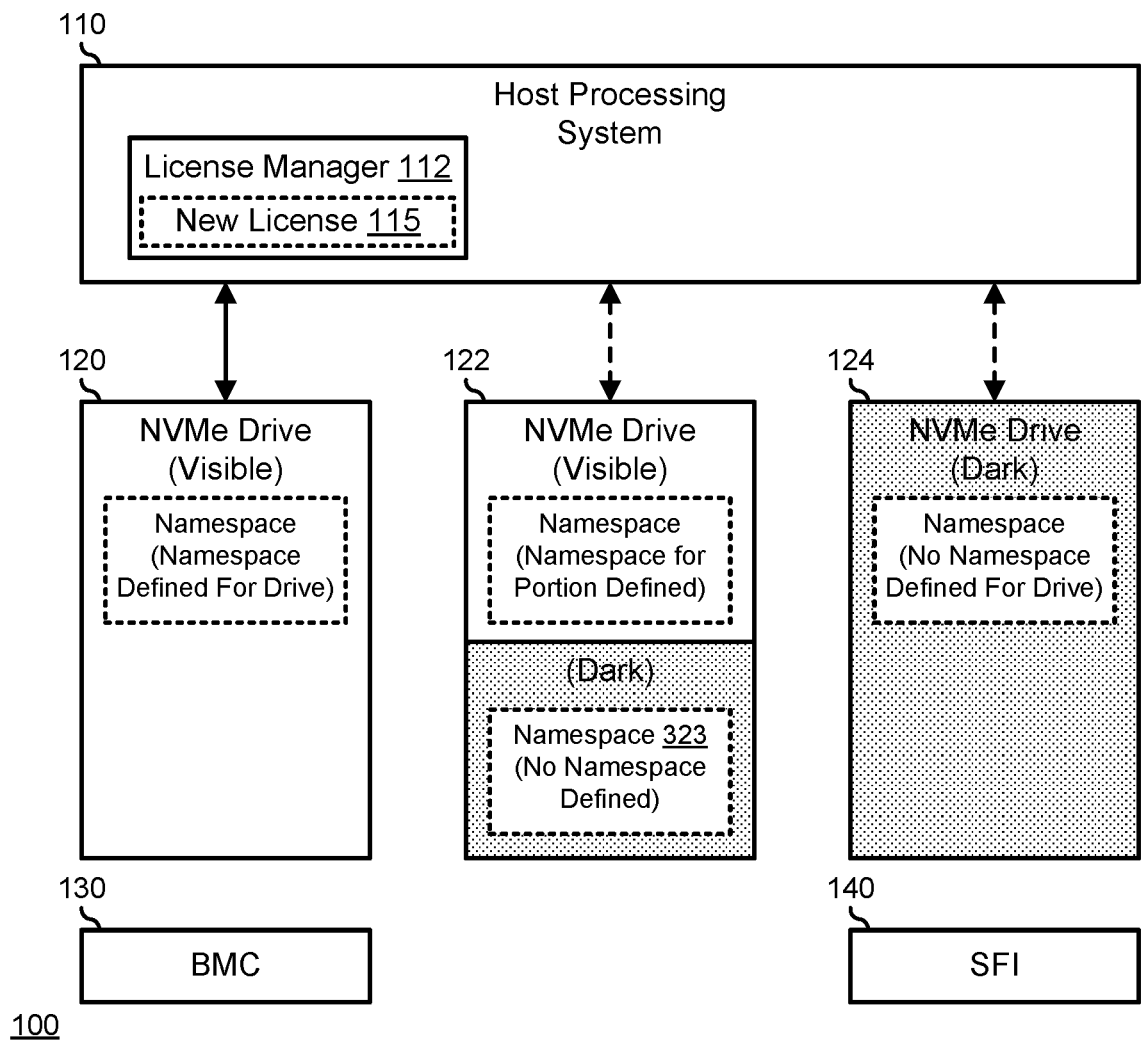
FIG. 5. is a block diagram illustrating another method of providing dark storage in the embodiment of FIG. 4.

FIG. 5 illustrates a case of the embodiment of FIG. 4. Here, it will be noted that a namespace does not need to define the entire data storage capacity of the associated data storage device as visible. That is, a namespace may be created on a data storage device that defines something less than the entire data storage capacity as visible. As such, when license 115 is instantiated on information handling system 100, a new namespace is defined for data storage device 122 that does not define the entire data storage capacity of the data storage device as being visible, but leaves a portion of the data storage capacity as dark data storage capacity. For example, where data storage device 122 has a four (4) TB data storage capacity, the namespace can be defined to make one (1) TB visible, two (2) TB visible, three (3) TB visible, or another amount of data storage capacity visible as needed or desired.

Figure 6:
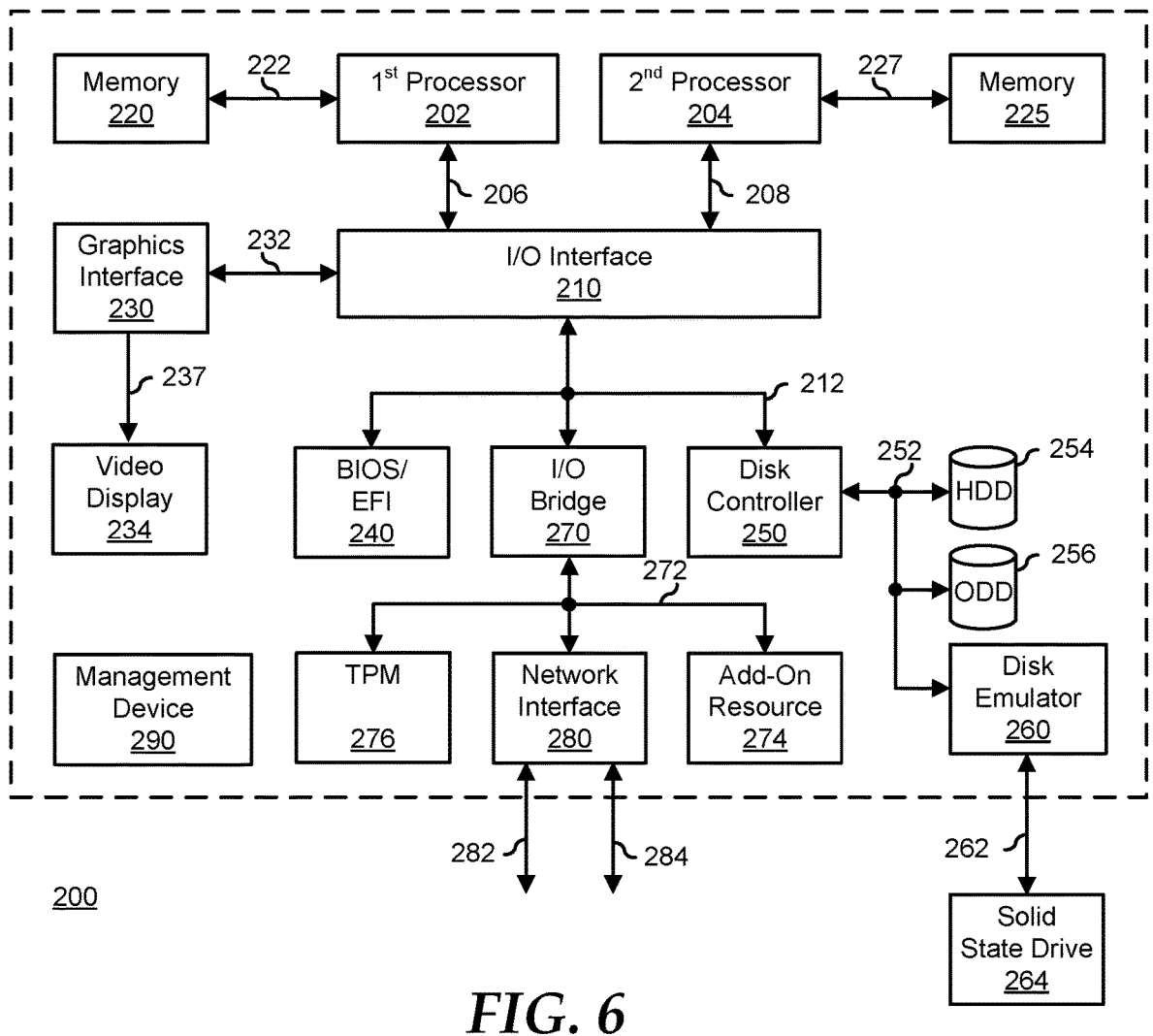
FIG. 6 is a block diagram illustrating a generalized information handling system according to another embodiment of the current disclosure.

FIG. 6 illustrates a generalized embodiment of an information handling system 200. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 200 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 200 can include processing resources for executing machine-executable code, such as a central processing unit (CPU), a programmable logic array (PLA), an embedded device such as a System-on-a-Chip (SoC), or other control logic hardware. Information handling system 200 can also include one or more computer-readable medium for storing machine-executable code, such as software or data. Additional components of information handling system 200 can include one or more storage devices that can store machine-executable code, one or more communications ports for communicating with external devices, and various input and output (I/O) devices, such as a keyboard, a mouse, and a video display. Information handling system 200 can also include one or more buses operable to transmit information between the various hardware components.

Information handling system 200 can include devices or modules that embody one or more of the devices or modules described below, and operates to perform one or more of the methods described below. Information handling system 200 includes a processors 202 and 204, an input/output (I/O) interface 210, memories 220 and 225, a graphics interface 230, a basic input and output system/universal extensible firmware interface (BIOS/UEFI) module 240, a disk controller 250, a hard disk drive (HDD) 254, an optical disk drive (ODD) 256, a disk emulator 260 connected to an external solid state drive (SSD) 262, an I/O bridge 270, one or more add-on resources 274, a trusted platform module (TPM) 276, a network interface 280, a management device 290, and a power supply 295. Processors 202 and 204, I/O interface 210, memory 220, graphics interface 230, BIOS/UEFI module 240, disk controller 250, HDD 254, ODD 256, disk emulator 260, SSD 262, I/O bridge 270, add-on resources 274, TPM 276, and network interface 280 operate together to provide a host environment of information handling system 200 that operates to provide the data processing functionality of the information handling system.

The host environment operates to execute machine-executable code, including platform BIOS/UEFI code, device firmware, operating system code, applications, programs, and the like, to perform the data processing tasks associated with information handling system 200.

In the host environment, processor 202 is connected to I/O interface 210 via processor interface 206, and processor 204 is connected to the I/O interface via processor interface 208. Memory 220 is connected to processor 202 via a memory interface 222. Memory 225 is connected to processor 204 via a memory interface 227. Graphics interface 230 is connected to I/O interface 210 via a graphics interface 232, and provides a video display output 236 to a video display 234. In a particular embodiment, information handling system 200 includes separate memories that are dedicated to each of processors 202 and 204 via separate memory interfaces. An example of memories 220 and 230 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 240, disk controller 250, and I/O bridge 270 are connected to I/O interface 210 via an I/O channel 212. An example of I/O channel 212 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 210 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 240 includes BIOS/UEFI code operable to detect resources within information handling system 200, to provide drivers for the resources, initialize the resources, and access the resources. BIOS/UEFI module 240 includes code that operates to detect resources within information handling system 200, to provide drivers for the resources, to initialize the resources, and to access the resources.

Disk controller 250 includes a disk interface 252 that connects the disk controller to HDD 254, to ODD 256, and to disk emulator 260. An example of disk interface 252 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 260 permits SSD 264 to be connected to information handling system 200 via an external interface 262. An example of external interface 262 includes a USB interface, an IEEE 1394 (Firewire) interface, a proprietary interface, or a combination thereof. Alternatively, solid-state drive 264 can be disposed within information handling system 200.

I/O bridge 270 includes a peripheral interface 272 that connects the I/O bridge to add-on resource 274, to TPM 276, and to network interface 280. Peripheral interface 272 can be the same type of interface as I/O channel 212, or can be a different type of interface. As such, I/O bridge 270 extends the capacity of I/O channel 212 when peripheral interface 272 and the I/O channel are of the same type, and the I/O bridge translates information from a format suitable to the I/O channel to a format suitable to the peripheral channel 272 when they are of a different type. Add-on resource 274 can include a data storage system, an additional graphics interface, a network interface card (NIC), a sound/video processing card, another add-on resource, or a combination thereof. Add-on resource 274 can be on a main circuit board, on separate circuit board or add-in card disposed within information handling system 200, a device that is external to the information handling system, or a combination thereof.

Network interface 280 represents a NIC disposed within information handling system 200, on a main circuit board of the information handling system, integrated onto another component such as I/O interface 210, in another suitable location, or a combination thereof. Network interface device 280 includes network channels 282 and 284 that provide interfaces to devices that are external to information handling system 200. In a particular embodiment, network channels 282 and 284 are of a different type than peripheral channel 272 and network interface 280 translates information from a format suitable to the peripheral channel to a format suitable to external devices. An example of network channels 282 and 284 includes InfiniBand channels, Fibre Channel channels, Gigabit Ethernet channels, proprietary channel architectures, or a combination thereof. Network channels 282 and 284 can be connected to external network resources (not illustrated). The network resource can include another information handling system, a data storage system, another network, a grid management system, another suitable resource, or a combination thereof.

Management device 290 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 200. In particular, management device 290 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 200, such as system cooling fans and power supplies. Management device 290 can include a network connection to an external management system, and the management device can communicate with the management system to report status information for information handling system 200, to receive BIOS/UEFI or system firmware updates, or to perform other task for managing and controlling the operation of information handling system 200. Management device 290 can operate off of a separate power plane from the components of the host environment so that the management device receives power to manage information handling system 200 when the information handling system is otherwise shut down. An example of management device 290 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 290 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a host processing system including a processor;
   a first data storage device having a first data storage capacity;
   a second data storage device having a second data storage capacity; and
   a license manager configured to:
   implement a first license on the information handling system, the first license defining a first licensed configuration wherein the first data storage device is visible to the host processing system and the first data storage capacity is available to the host processing system, and the second data storage device is not visible to the host processing system and the second data storage capacity is not available to the host processing system;
   receive a second license defining a second licensed configuration wherein the first and second data storage devices are visible to the host processing system and the first and second data storage capacities are available to the host processing system; and
   implement the second license on the information handling system without a reboot of the information handling system.

2. The information handling system of claim 1, further comprising:
   a system firmware intermediary (SFI) configurable to mask the first and second data storage devices from the host processing system, wherein in implementing the first license, the license manager is further configured to direct the SFI to mask the second data storage device from the host processing system, and wherein in implementing the second license, the license manager is further configured to direct the SFI to unmask the second data storage device from the host processing system.

3. The information handling system of claim 2, wherein, in unmasking the second data storage device from the host processing system, the SFI operates to provide a hot plug interrupt to the host processing system to indicate that the second data storage device has been hot plugged into the information handling system.

4. The information handling system of claim 1, further comprising:
   a baseboard management controller (BMC) configurable to control a hardware signal to the second data storage device, wherein in controlling the hardware signal in a first state, the second data storage device is prevented from being initialized, and wherein in controlling the hardware signals in a second state, the second data storage device is permitted to initialize.

5. The information handling system of claim 4, wherein in implementing the first license, the license manager is further configured to direct the BMC to control the hardware signal in the first state, and wherein in implementing the second license, the license manager is further configured to direct the BMC to control the hardware signal in the second state.

6. The information handling system of claim 5, wherein, when the hardware signal is in the second state, the second data storage device indicates that the second data storage device has been hot plugged into the information handling system.

7. The information handling system of claim 4, wherein the hardware signal includes at least one of a reset signal, a power enable signal, and a device presence signal.

8. The information handling system of claim 1, wherein in implementing the second license, the license manager is further configured to write a namespace definition to the second data storage device.

9. The information handling system of claim 8, wherein the namespace definition defines a third data storage capacity that is less than the second data storage capacity.

10. The information handling system of claim 1, wherein, subsequent to implementing the second license, the license manager is further configured to:
    receive a third license defining a third licensed configuration wherein at least one of the first and second data storage devices are invisible to the host processing system;
    implement the third license on the information handling system without the reboot of the information handling system.

11. A method, comprising:
    implementing, by a license manager of an information handling system, a first license on the information handling system, the first license defining a first licensed configuration wherein a first data storage device of the information handling system is visible to a host processing system of the information handling system and a first data storage capacity of the first data storage device is available to the host processing system, and wherein a second data storage device of the information handling system is not visible to the host processing system and a second data storage capacity of the second data storage device is not available to the host processing system;
    receiving a second license defining a second licensed configuration wherein the first and second data storage devices are visible to the host processing system and the first and second data storage capacities are available to the host processing system; and
    implementing the second license on the information handling system without a reboot of the information handling system.

12. The method of claim 11, further comprising:
    providing a system firmware intermediary (SFI) of the information handling system, the SFI configurable to mask the first and second data storage devices from the host processing system;
    wherein in implementing the first license, the method further comprises directing the SFI to mask the second data storage device from the host processing system, and wherein in implementing the second license, the method further comprises directing the SFI to unmask the second data storage device from the host processing system.

13. The method of claim 12, wherein, in unmasking the second data storage device from the host processing system, the method further comprises:
providing, by the SFI, a hot plug interrupt to the host processing system to indicate that the second data storage device has been hot plugged into the information handling system.

14. The method of claim 11, further comprising:
providing a baseboard management controller (BMC) of the information handling system, the BMC configurable to control a hardware signal to the second data storage device, wherein in controlling the hardware signal in a first state, the second data storage device is prevented from being initialized, and wherein in controlling the hardware signals in a second state, the second data storage device is permitted to initialize.

15. The of claim 14, wherein:
in implementing the first license, the method further comprises directing the BMC to control the hardware signal in the first state; and
wherein in implementing the second license, the method further comprises directing the BMC to control the hardware signal in the second state.

16. The method of claim 15, further comprising:
Indicating, by the second data storage device when the hardware signal is in the second state, that the second data storage device has been hot plugged into the information handling system.

17. The method of claim 14, wherein the hardware signal includes at least one of a reset signal, a power enable signal, and a device presence signal.

18. The method of claim 11, wherein in implementing the second license, the method further comprises:
writing a namespace definition to the second data storage device.

19. The method of claim 18, wherein the namespace definition defines a third data storage capacity that is less than the second data storage capacity.

20. An information handling system, comprising:
a host processing system including a processor;
a first Non-Volatile Memory-Express (NVMe) data storage device having a first data storage capacity;
a second NVMe data storage device having a second data storage capacity; and
a license manager configured to:
implement a first license on the information handling system, the first license defining a first licensed configuration wherein the first NVMe data storage device is visible to the host processing system and the first data storage capacity is available to the host processing system, and the second NVMe data storage device is not visible to the host processing system and the second data storage capacity is not available to the host processing system;
receive a second license defining a second licensed configuration wherein the first and second NVMe data storage devices are visible to the host processing system and the first and second data storage capacities are available to the host processing system; and
implement the second license on the information handling system without a reboot of the information handling system.

* * * * *